(12) United States Patent
Carati et al.

(10) Patent No.: US 7,018,595 B2
(45) Date of Patent: Mar. 28, 2006

(54) PROCESS FOR PREPARING BOUND ZEOLITES

(75) Inventors: Angela Carati, Milan (IT); Giuseppe Bellussi, Piacenza (IT); Maria Angela Mantegazza, Milan (IT); Giudo Petrini, Novara (IT)

(73) Assignee: Enichem S.p.A., San Donato Milanese (IT)

( * ) Notice: Subject to any disclaimer, the term of this patent is extended or adjusted under 35 U.S.C. 154(b) by 20 days.

(21) Appl. No.: 10/315,022

(22) Filed: Dec. 10, 2002

(65) Prior Publication Data

US 2003/0083190 A1    May 1, 2003

Related U.S. Application Data

(62) Division of application No. 09/159,751, filed on Sep. 24, 1998, now Pat. No. 6,524,984.

(30) Foreign Application Priority Data

Oct. 3, 1997   (IT) .......................................... MI97A2250

(51) Int. Cl.
*C01B 33/26* (2006.01)
*C01B 37/00* (2006.01)

(52) U.S. Cl. ............... 423/326; 423/707; 423/DIG. 22; 423/DIG. 29

(58) Field of Classification Search ................ 423/707, 423/335, 326, DIG. 22, DIG. 29
See application file for complete search history.

(56) References Cited

U.S. PATENT DOCUMENTS

| 4,061,724 A | * | 12/1977 | Grose et al. ................ 423/705 |
| 4,410,501 A | * | 10/1983 | Taramasso et al. .......... 423/705 |
| 5,246,690 A | * | 9/1993 | Bellussi et al. ............. 423/705 |
| 5,656,252 A | * | 8/1997 | Tuel et al. .................. 423/705 |
| 6,054,112 A | * | 4/2000 | Hasenzahl et al. .......... 423/705 |
| 6,106,803 A | * | 8/2000 | Hasenzahl et al. .......... 423/705 |

FOREIGN PATENT DOCUMENTS

| DE | 44 07 872 | 2/1996 |
| EP | 0 018 090 | 10/1980 |
| EP | 0 226 257 | 6/1987 |
| EP | 0 226 258 | 6/1987 |
| EP | 0 265 018 | 4/1988 |
| EP | 0 282 902 | 9/1988 |
| EP | 0 638 362 | 2/1995 |
| EP | 0 838 431 | 4/1998 |
| FR | 2 471 950 | 6/1981 |
| GB | 29 40 103 | 5/1981 |

OTHER PUBLICATIONS

Zhang, G., et al., Chemistry of Materials, vol. 9, No. 1, pp. 210–217, "Preparation of Colloidal Suspensions of Discrete TS–1 Crystals", Jan. 1, 1997.
Reddy, J.S., et al., Journal of Catalysts, vol. 130, No. 2, pp. 440–446, "Synthesis, Characterization, and Catalytic Properties of a Titanium Silicate, Ts–2, With Mel Structure", Aug. 1, 1991.
Jorda, E., et al., Zeolites, vol. 19, No. 4 pp. 238–245; "TIF: An Orginal and Very Interesting Precursor to the Synthesis of Titanium Containing Silicalite–1", 1997.
Journal of Catalysts, vol. 137, pp. 497–503, "Framework Composition of Titanium Silicalite–", 1992.
Uguina, M.A., et al., Zeolites, vol. 18, No. 5/06, pp. 368–378, "TS–2 Synthesis From Wetness–Impregnated $SiO_2$–$TiO_2$. Xerogels,", 1997.

* cited by examiner

*Primary Examiner*—David Sample
(74) *Attorney, Agent, or Firm*—Oblon, Spivak, McClelland, Maier & Neustadt, P.C.

(57)   ABSTRACT

A process is described for the preparation of zeolitic catalysts in the form of microspheres, comprising zeolite and oligomeric silica, characterized by a high mechanical resistance. The process consists in subjecting to rapid drying the suspension, to which tetra-alkylorthosilicate is optionally added, resulting from the synthesis of zeolite by hydrothermal treatment at autogenous pressure of the reagent mixture containing tetra-alkylammoniumhydroxide as templating agent, and subjecting the product resulting from the drying to calcination.

3 Claims, 4 Drawing Sheets

PROCESS FOR PREPARING BOUND ZEOLITES

This application is a division of application Ser. No. 09/159,751, filed Sep. 24, 1998, now U.S. Pat. No. 6,524,984.

The present invention relates to a new process for preparing zeolitic catalysts in the form of microspheres, comprising zeolite and oligomeric silica, characterized by a high mechanical resistance.

It is known that zeolites, synthetic porous crystalline materials having a catalytic activity, can be bound by means of inorganic binders to increase the dimensions and enable them to be used in industrial plants. In fact, whereas on the one hand small dimensions of the zeolite crystallites favour the intraparticle diffusion of the reagents and reaction products and allow good catalytic performances to be obtained, similar dimensions on the other hand make interparticle diffusion impossible in fixed-bed reactors or the separation of the zeolitic catalyst from the reaction medium in mixing reactors. To overcome this, the zeolites are bound with suitable binders. The preparation methods of bound zeolites must be such as to prevent the blocking of the zeolitic cavities which would obviously cause a reduction in the catalytic activity. For reactions in which a catalytic contribution on the part of the binder should be avoided, such as for example many oxidations and acid-catalyzed reactions, the use of a catalytically inert material such as silica as binder is of particular interest. Silica however has poor binding properties and is therefore not normally used in extrusion as it is not capable of providing the extruded product with sufficient hardness. EP 265018 describes a process for preparing catalysts based on zeolites and oligomeric silica. The zeolitic catalysts bound in microspheric form according to this method are characterized by a high mechanical resistance and are very suitable for reactions which take place in a fluid bed or in slurry reactors. This process comprises at least the following steps:

a) preparation of the zeolite to be bound by crystallization under hydrothermal conditions of the appropriate mixture of reagents;
b) separation of the zeolite crystals obtained in phase (a);
c) possible washing of the zeolite by redispersion in water and new separation of the crystalline phase;
d) preparation of an aqueous solution of oligomeric silica and tetra-alkylammonium hydroxide by hydrolysis in liquid phase of a tetra-alkylorthosilicate in an aqueous solution of tetra-alkylammonium hydroxide, at a temperature ranging from 2 to 120° C., for a time ranging from 0.2 to 24 hours;
e) dispersion of the crystalline zeolitic phase obtained under point (c) in the solution described under point (d);
f) rapid drying of this dispersion by feeding to a spray-drier;
g) calcination of the microspheres of the product obtained in the drying step.

We have now found a considerably simplified process for preparing catalysts comprising zeolites and oligomeric silica having a high mechanical resistance. This simplified process is capable of giving the binding phase particular properties such as pore distribution essentially in the mesoporous region and a high surface area, which guarantee the absence of diffusional barriers on the part of the binder while the catalytic properties of the zeolite remain unaltered. This new process at the same time allows both a reduction in the number of unitary operations required and also a reduction in the quantity of reagents used. In particular, unlike the prior art, the process of the present invention no longer requires a separation passage of the zeolitic crystalline phase from the suspension obtained at the end of the synthesis: it has in fact been unexpectedly found that, for zeolites whose synthesis require the presence of tetra-alkylamonium hydroxide (TAAOH) as templating agent, i.e. as a compound capable of inducing a regular and constant porosity in the structure of the zeolite, the resulting suspension at the end of the synthesis, in which zeolite crystals and tetra-alkylammoniumhydroxide remaining in solution, are present, can be used as such, without further purification and/or filtration passages, for the preparation of zeolites bound with oligomeric silica in the form of microspheres. The possibility of avoiding the separation step of the zeolite is, from an industrial point of view, a great advantage, particularly when operating with zeolite crystals having dimensions of less than 0.5μ, which cannot be separated from the synthesis medium with the usual techniques, for example by filtration or continuous centrifuges, but require the use of more costly techniques operating batchwise.

The present invention therefore relates to a process for the preparation of zeolitic catalysts in the form of microspheres comprising zeolite and oligomeric silica which consists in subjecting to rapid drying the suspension, to which tetra-alkylorthosilicate is optionally added, resulting from the synthesis of zeolite by hydrothermal treatment at autogenous pressure of the reagent mixture containing tetra-alkylammonium hydroxide as templating agent, and subjecting the product resulting from the drying to calcination.

In the suspension obtained at the end of the synthesis of the zeolite by hydrothermal treatment in the presence of tetra-alkylammonium hydroxide (TAAOH) as templating agent, which is subjected to rapid drying according to the present invention, zeolite crystals, the fraction of tetra-alkylammonium hydroxide which has not been englobed inside the pores of the zeolite and possibly oxides of silicon and other heteroatoms, will be present. It is in fact known that in the synthesis of zeolites, it is necessary to use an excess of tetra-alkylammonium hydroxide and consequently part of the TAAOH is in solution in the reaction medium at the end of the synthesis. The use of this suspension resulting from the synthesis of the zeolite, in addition to the advantages described above, therefore enables a reduction in the total quantity of TAAOH used in the process for the preparation of zeolites bound with oligomeric silica, with respect to that necessary in the process of the prior art EP 265018 in which it was necessary to prepare separately a mixture of TAAOH and oligomeric silica and add it to the zeolite crystals, separated by filtration or centrifugation, before the rapid drying step.

When, according to the present invention, tetra-alkylorthosilicate is added to the suspension resulting from the synthesis of zeolite, before this is subjected to rapid drying, it will be added in a quantity ranging from 0.08 to 0.50 moles per 100 grams of zeolite contained in the suspension. The tetra-alkylorthosilicate is selected from compounds having the formula $Si(OR)_4$ wherein the R substituents, which can be equal to or different from each other, are alkyl chains containing from 1 to 4 carbon atoms.

The rapid drying of the suspension is preferably carried out by feeding to a spray-drier. At the end of the rapid drying treatment microspheres are obtained which are calcined at a temperature ranging from 400 to 800° C.

The zeolitic catalysts obtained according to the process of the present invention are characterized by a high mechanical resistance, they comprise oligomeric silica and zeolite in a weight ratio ranging from 0.05 to 0.30 and are in the form of microspheres having a diameter ranging from 5 to 300 μm in which the zeolite crystals are encaged by Si—O—Si bridges. The zeolites which can be bound with oligomeric silica by means of the process of the present invention are those whose preparation comprises the use of tetra-alkylammonium hydroxide as templating agent, in particular zeolites which can be well used can be selected from those with an MFI, MEL, MFI/MEL, MOR, FAU, FAU/EMT and BEA structure.

Suspensions which can be subjected to rapid drying and subsequent calcination to obtain zeolites bound with oligomeric silica, according to the present invention, are those resulting from the synthesis of zeolite under hydrothermal conditions, at autogenous pressure, and in the presence of TAAOH, effected with the methods described in the prior art and known to experts in the field: in particular, according to a preferred aspect of the present invention, the zeolite which is bound is the silicalite belonging to the MFI group, or a zeolite consisting of silicon and aluminum oxides having an MFI, MEL, MFI/MEL, BEA, MOR, FAU and FAU/EMT structure. The suspensions resulting from these syntheses contain zeolite crystals, tetra-alkylammonium hydroxide, silicon and optionally aluminum oxides; in this case the addition of tetra-alkylorthosilicate is not necessary; these suspensions are fed directly to the spray-drier and the resulting microspheres calcined under the conditions described above.

One aspect of the present invention is therefore a process for the preparation of zeolitic catalysts in the form of microspheres comprising zeolite and oligomeric silica, wherein the zeolite is selected from silicalite belonging to the MFI group, or a zeolite consisting of silicon and aluminum oxides having an MFI, MEL, MFI/MEL, BEA, MOR, FAU and FAU/EMT structure, which consists in subjecting to rapid drying, the suspension resulting from the synthesis of said zeolite by hydrothermal treatment at autogenous pressure of the reagent mixture containing tetra-alkylammonium hydroxide as templating agent, and subjecting the product resulting from the drying to calcination.

The conditions under which these suspensions are prepared are those known to experts in the field and are normally described in the prior art. For example, the silicalite belonging to the MFI group, called S-1, and its preparation are described in U.S. Pat. No. 4,061,724; a BEA zeolite consisting of silicon and aluminum oxides, called zeolite beta, and its preparation, are described in U.S. Pat. No. 3,308,069; an MFI zeolite consisting of silicon and aluminum oxides, called ZSM-5, and its preparation are described in U.S. Pat. No. 3,702,886 and in the reissue U.S. Pat. No. 29,948; a MOR zeolite consisting of silicon and aluminum oxides, called mordenite, and its preparation are described in U.S. Pat. No. 4,052,472; a FAU zeolite consisting of silicon and aluminum oxides, called N—Y, and its preparation are described in U.S. Pat. No. 3,306,922; a FAU/EMT zeolite consisting of silicon and aluminum oxides, called ECR-30 and its preparation are described in EP 315461; an MFI/MEL zeolite consisting of silicon and aluminum oxides, called ZSM-5/ZSM-11 is described in U.S. Pat. No. 4,289,607; a MEL zeolite consisting of silicon and aluminum oxides, called ZSM-11 is described in U.S. Pat. No. 3,709,979.

The product resulting from the drying, before being calcined, can optionally be subjected to a treatment in air at 200–300° C. for 2–10 hours and an exchange in acid form according to the known techniques to remove the alkaline metals possibly present.

The most suitable zeolite for being bound according to this preferred aspect is silicalite S-1. The zeolitic material in microspheres having a diameter of 5 to 300 µm, consisting of silicalite S-1 and oligomeric silica, in a weight ratio oligomeric silica/silicalite ranging from 0.05 to 0.3, characterized by a high mechanical resistance, used in the field of catalysis, is new and is a further object of the present invention. When zeolites consisting of silicon and aluminum oxides belonging to the MFI, MEL, MFI/MEL, BEA, MOR, FAU and FAU/EMT groups, are used, small quantities of alumina are also present in the binding phase of the end-catalyst. These latter catalysts prepared according to the process of the present invention, having a high mechanical resistance, which are useful in transformation processes of hydrocarbons, as acid catalysis reactions, are new and are a further object of the present invention.

According to a particularly preferred aspect of the present invention, when the zeolite to be bound belongs to the MFI, MFI/MEL and MEL group, and optionally contains other heteroatoms as well as silicon, the suspension which is subjected to rapid drying is that deriving from the synthesis of the zeolite produced so as to obtain a crystallization yield of the zeolite as close as possible to 100%, for example between 98 and 100%. It is particularly preferable to operate in such a way as to obtain a crystallization yield of 100% which corresponds to a total recovery in the zeolite of all the silica and possible heteroatom present in the reagent mixture. The zeolites of the MFI, MFI/MEL and MEL group which are particularly suitable for being prepared with a crystallization yield of 100% and are therefore preferably bound according to this preferred aspect of the present invention, are selected from:

1) MFI zeolites having the formula p $HMO_2 \cdot q\ TiO_2 \cdot SiO_2$, wherein M is a metal selected from aluminum, gallium and iron, p has a value ranging from 0 to 0.04 and q has a value ranging from 0.0005 to 0.03. In particular when p is 0, the zeolite is titanium silicalite TS-1 described in U.S. Pat. No. 4,410,501; zeolites in which p is different from 0 and M=Al, Ga and Fe are described in EP 226257, EP 266825 and EP 226258, respectively;
2) MFI zeolites having the formula a $Al_2O_3 \cdot (1-a)SiO_2$, wherein a has a value ranging from 0 to 0.02. In particular when a is 0 the zeolite is the silicalite S-1 described in U.S. Pat. No. 4,061,724; when a is different from 0 the zeolite is ZSM-5 described in U.S. Pat. No. 3,702,886 and in the reissue U.S. Pat. No. 29,948;
3) MEL or MFI/MEL zeolites having the formula x $TiO_2 \cdot (1-x)SiO_2$, wherein x has a value ranging from 0.0005 to 0.03. These zeolites are described in BE 1001038 and are called TS-2 and TS-1/TS-2.

Therefore, in accordance with the preferred aspect of operating so that the suspension subjected to rapid drying derives from the synthesis of an MFI zeolite with a crystallization yield of more than 98%, preferably 100%, the present invention relates to a process for the preparation of zeolitic catalysts in the form of microspheres, consisting of MFI zeolite having the formula p $HMO_2 \cdot q\ TiO_2 \cdot SiO_2$ and oligomeric silica, wherein M is a metal selected from aluminum, gallium and iron, p has a value ranging from 0 to 0.04 and q has a value ranging from 0.0005 to 0.03, which consists in:

a) synthesis of the zeolite by means of hydrothermal treatment at autogenous pressure, at a temperature ranging from 190 to 230°C. and for a time ranging from 0.5 to 10 hours, without alkali metals, of a mixture containing a silicon source, a titanium source, optionally a source of a metal M, and tetrapropylammoniumhydroxide having the following composition expressed as molar ratios:

Si/Ti=35–2000

M/Si=0–0.04 wherein M is selected from Al, Ga and Fe

TPA-OH/Si=0.2–0.5 wherein TPA= tetrapropylammonium

H$_2$O/Si=10–35 b) addition of tetra-alkylorthosilicate to the suspension resulting from the previous step a);
c) rapid drying of the suspension obtained in step b);
d) calcination of the product obtained in step c).

The silicon, titanium and metal sources are those described in U.S. Pat. No. 4,410,501, EP 226257, EP 266825 and EP 226258. The silicon source is preferably tetraethylorthosilicate, the titanium source is preferably tetraethylorthotitanate, the metal source is preferably a soluble salt of the metal. The zeolite which is preferably bound according to this method is titanium-silicalite TS-1.

In accordance with the preferred aspect of operating so that the suspension subjected to rapid drying derives from the synthesis of an MFI zeolite with a crystallization yield of more than 98%, preferably 100%, and the MFI zeolite to be bound is a Al$_2$O$_3$.(1–a) SiO$_2$, a further object of the present invention relates to a process for the preparation of zeolitic catalysts in the form of microspheres, consisting of MFI zeolite having the formula a Al$_2$O$_3$.(1–a) SiO$_2$ and oligomeric silica, wherein a has a value ranging from 0 to 0.02, which consists in:

a) synthesis of the zeolite by means of hydrothermal treatment at autogenous pressure, at a temperature ranging from 190 to 230°C. and for a time ranging from 0.5 to 10 hours, without alkali metals, of a mixture containing a silicon source, optionally an aluminum source, tetrapropylammonium hydroxide, having the following composition expressed as molar ratios:

Al/Si=0–0.04

TPA-OH/Si=0.2–0.5 wherein TPA= tetrapropylammonium

H$_2$O/Si=10–35 b) addition of tetra-alkylorthosilicate to the suspension resulting from the previous step a);
c) rapid drying of the suspension obtained in step b);
d) calcination of the product obtained in step c).

The silicon and aluminum sources are those described in U.S. Pat. No. 4,061,724 and U.S. Pat. No. 3,702,886. The silicon source is preferably tetraethylorthosilicate, the aluminum source is preferably Al(OR)$_3$ wherein R is an alkyl containing from 3 to 4 carbon atoms.

In accordance with the preferred aspect of operating so that the suspension subjected to rapid drying derives from the synthesis of an MFI/MEL or MEL zeolite with a crystallization yield of more than 98%, preferably 100%, and the MFI/MEL or MEL zeolite to be bound is x TiO$_2$.(1-x) SiO$_2$, a further object of the present invention relates to a process for the preparation of zeolitic catalysts in the form of microspheres, consisting of MFI/MEL or MEL zeolite having the formula x TiO$_2$.(1–x) SiO$_2$ and oligomeric silica, wherein x has a value ranging from 0.0005 to 0.03, which consists in:

a) synthesis of the zeolite by means of hydrothermal treatment at autogenous pressure, at a temperature ranging from 190 to 230°C. and for a time ranging from 0.5 to 10 hours, without alkali metals, of a mixture containing a silicon source, a titanium source, tetra-alkylammoniumhydroxide having the following composition expressed as molar ratios:

Si/Ti=35–2000

TAA-OH/Si=0.2–0.5

H$_2$O/Si=10–35 b) addition of tetra-alkylorthosilicate to the suspension resulting from the previous step a);
c) rapid drying of the suspension obtained in step b);
d) calcination of the product obtained in step c).

The silicon source, the titanium source and the tetra-alkylammoniumhydroxide which can be used, also in binary or ternary mixtures, are those described in BE 1.001.038. The silicon source is preferably tetra-ethylorthosilicate, the titanium source is preferably tetraethylorthotitanate.

The hydrothermal treatment in the previous synthesis steps (a) of the zeolite is preferably carried out at a temperature ranging from 200 to 230° C., and is effected, for example, at a temperature higher than 200° C. and less than or equal to 230° C.

The particular composition combination of the reaction mixture and reaction temperature used in the previous steps a), which enables the preparation of zeolites with an MFI, MFI/MEL and also MEL structure, in particular TS-1 and S-1, with a very high crystallization yield, preferably 100%, is in itself new and is a further aspect of the present invention. In the examples relating to the preparation of zeolites with an MFI, MEL and MFI/MEL structure described in the prior art the crystallization yield specified or calculable is also much lower than 100%.

Using this particular composition combination and reaction conditions in step (a), microspheres are obtained, at the end of step d), consisting of MFI, MEL, or MFI/MEL zeolite, bound with oligomeric silica, preferably TS-1 and S-1, with a weight ratio oligomeric silica/zeolite ranging from 0.05 to 0.3, having a high surface area, a pore distribution in the binding phase essentially in the mesoporous region, a high mechanical resistance, which can be used in the field of catalysis. In particular, the zeolitic material in microspheres having a diameter ranging from 5 to 300 μm, consisting of zeolite TS-2 or TS-1/TS-2 and oligomeric silica, in a weight ratio oligomeric silica/zeolite ranging from 0.05 to 0.3 is new and is a further object of the present invention.

In the previous steps (b) the tetra-alkylorhtosilicate (TAOS), preferably tetraethylorthosilicate, is added in a quantity ranging from 0.08 to 0.50 moles per 100 grams of zeolite contained in the suspension obtained at the end of step a).

The suspension deriving from step (b) is preferably heated to 40–100° C. for 0.5–10 hours, before being subjected to the rapid drying step.

In the previous steps (c), the suspension obtained from step (b) is subjected to rapid drying, preferably with a spray-drier, obtaining microspheres consisting of a tridimensional silica lattice in which the zeolite crystallites are tightly encaged with Si—O—Si bridges.

The microspheres resulting from step (c) are calcined at a temperature ranging from 400 to 800° C.

EXAMPLE 1

1873 g of tetrapropylammonium hydroxide (TPA-OH) at 14% by weight in aqueous solution are charged into an autoclave. 547 g of tetraethylorthosilicate (TEOS) and a solution consisting of 547 g of TEOS and 30 g of tetraethylorthotitanate (TEOT) are then rapidly added in succession, operating in a closed system. Without subjecting the mixture thus prepared to aging, the hydrothermal treatment is immediately initiated at autogenous pressure at 200° C. for 2 hours. When the crystallization has terminated, the autoclave is cooled and a lactescent suspension is discharged.

100 g of this suspension are centrifuged, redispersed in water and centrifuged again; the solid obtained is dried, calcined and used to characterize the crystalline phase. The crystallization yield proved to be 100%, chemical analysis gave the following result: $SiO_2$=96.8%, $TiO_2$=3.19%

Upon TEM analysis, crystallines agglomerations are with an average diameter of 0.3 µm are observed.

Figure 1:
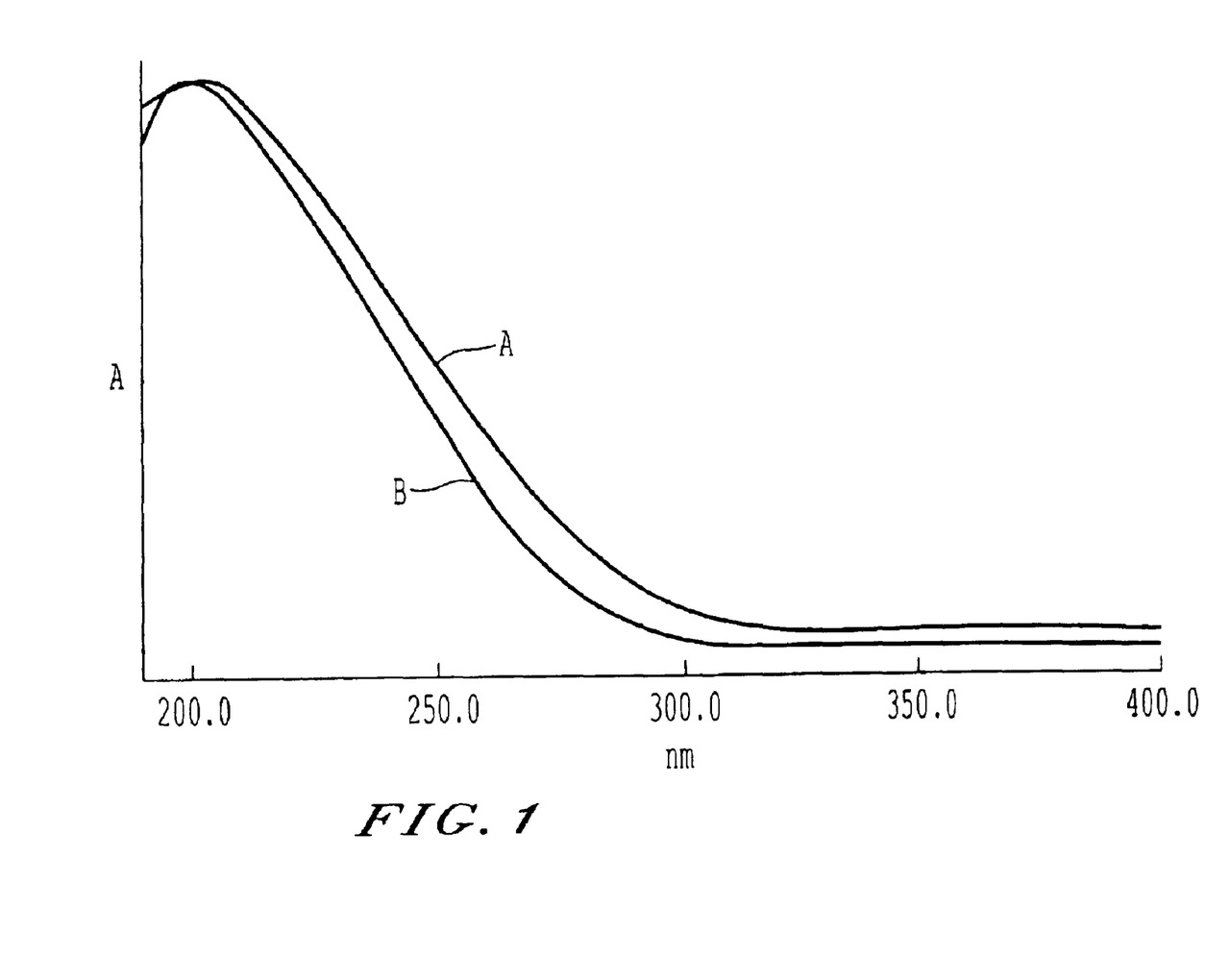

The UV-Vis spectrum is shown in FIG. 1 curve A (the wave length is indicated in abscissa, the absorbance in ordinate).

110 g of TEOS are added to the remaining lactescent suspension, the mixture is heated to 60° C. for 1 hour and then sent to the spray-drier (Niro Mobile Minor HI-TEC, temperature of in-going air 230° C.; temperature of out-going air 150° C., diameter of chamber: 1 m). Compact microspheres having an average diameter of 30 µm, are obtained, and a weight ratio oligomeric silica/zeolite of 0.1. The microspheres are put in muffle in a nitrogen atmosphere and heated to 550° C. After 2 hours of residence at that temperature in nitrogen, the atmosphere is gradually changed from nitrogen to air and the product left for a further 2 hours at 550° C. in air. The product obtained has the following composition $SiO_2$=97.05% $TiO_2$=2.94%

Figure 2:
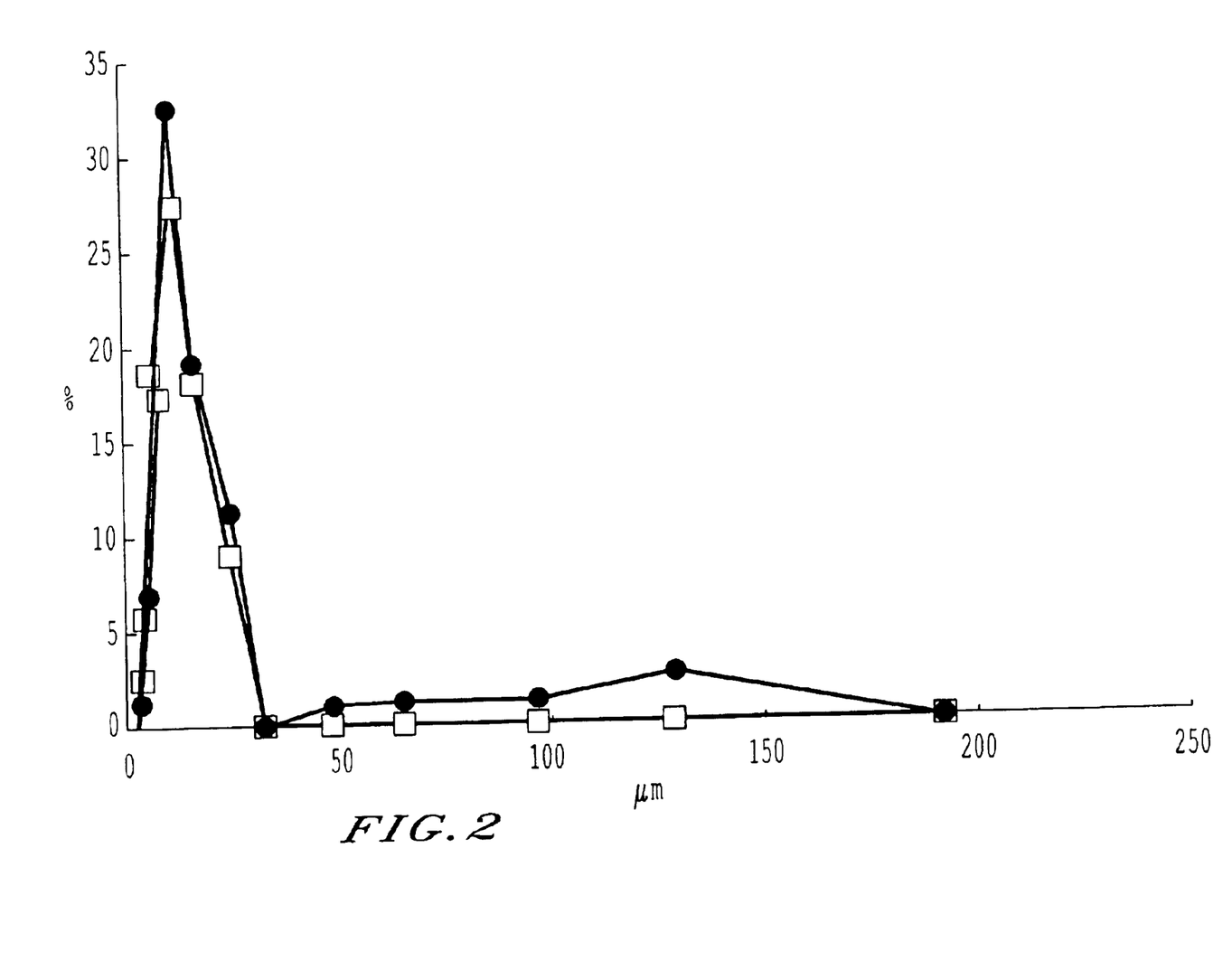

The UV-Vis spectrum is shown in FIG. 1, curve B. On comparing the spectra indicated in FIG. 1, it can be seen that in both the samples all the titanium is in tetrahedric coordination and thus inserted in the zeolitic framework. FIG. 2 indicates the distribution of the dimensions of the microspheres, determined by Granulometre 715 E608, measured before the ultrasound treatment (curve —●—) and after treatment for 1 hour in ultrasounds (curve —☐—) (Branson Bath 5200). The average diameter of the microspheres expressed in µm is indicated in abscissa, the % of microspheres in ordinate. From the figure it can be observed that the particle distribution is not modified after the ultrasound treatment and that the catalyst therefore has a good mechanical resistance.

EXAMPLE 2

2288 g of tetrapropylammonium hydroxide (TPA-OH) at 14% by weight in aqueous solution are dissolved in 7 g of aluminum isopropylate and 1094 g of tetraethylorthosilicate (TEOS) are then added. The solution obtained is charged into an autoclave and subjected to hydrothermal treatment at autogenous pressure at 200° C. for 2 hours. When the crystallization has terminated, the autoclave is cooled and a lactescent suspension is discharged.

100 g of this suspension are centrifuged, redispersed in water and centrifuged again; the solid obtained is dried, calcined and used to characterize the crystalline phase. The crystallization yield proved to be 100%, chemical analysis gave the following result:

$SiO_2$=99.44%, $Al_2O_3$=0.56%

110 g of TEOS are added to the remaining lactescent suspension, the mixture is heated to 60° C. for 1 hour and then sent to the spray-drier (Niro Mobile Minor HI-TEC, temperature of in-going air 230° C.; temperature of out-going air 150° C., diameter of chamber: 1 m). Compact microspheres having an average diameter of 30 µm, are obtained, and a weight ratio oligomeric silica/zeolite of 0.1. The microspheres are put in muffle in a nitrogen atmosphere and heated to 550° C. After 2 hours of residence at that temperature in nitrogen, the atmosphere is gradually changed from nitrogen to air and the product left for a further 2 hours at 550° C. in air. The product obtained has the following composition $SiO_2$=99.49% $Al_2O_3$=0.51%

Figure 3:
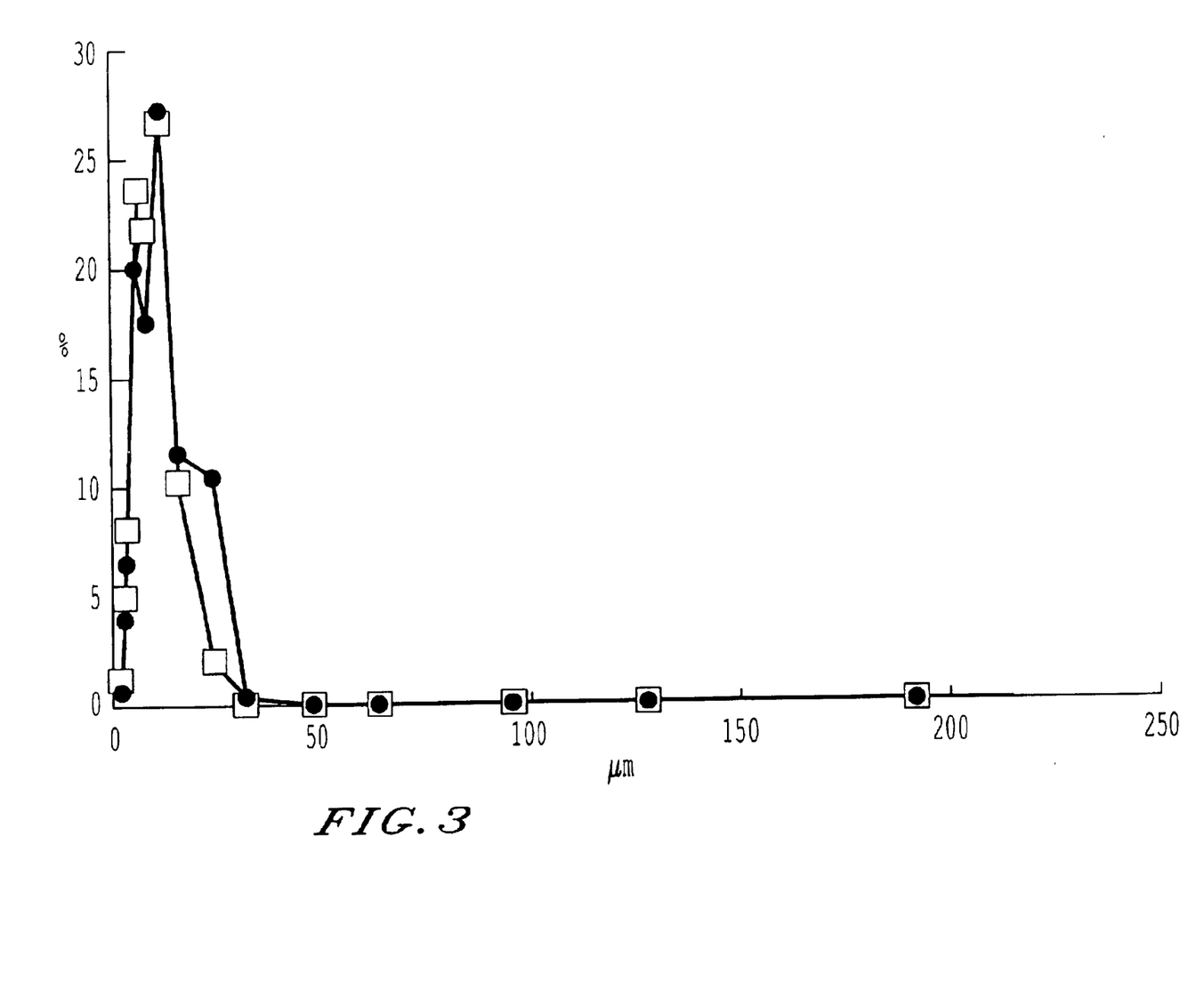

FIG. 3 shows the distribution of the dimensions of the microspheres, determined by Granulometre 715 E608, measured before the ultrasound treatment (curve —●—) and after treatment of 1 hour in ultrasounds (curve —☐—) (Branson Bath 5200). The average diameter of the microspheres expressed in µm is indicated in abscissa, the % of microspheres in ordinate. From the figure it can be observed that the particle distribution is not modified after the ultrasound treatment and that the catalyst therefore has a good mechanical resistance.

EXAMPLE 3

1102 g of water and 1096 g of TEOS are added to 802 g of TPA-OH at 40%. The solution obtained is charged into an autoclave and subjected to hydrothermal treatment for 3 hours at 180° C. The autoclave is then cooled and a lactescent suspension is discharged. 100 g of this suspension are centrifuged, redispersed in water and centrifuged again; the solid obtained is dried, calcined. The crystallization yield proved to be 84%. The remaining suspension is sent as such to the spray-drier (Buchi 190, temperature at the inlet 200° C.; temperature at the outlet 140° C.).

Figure 4:
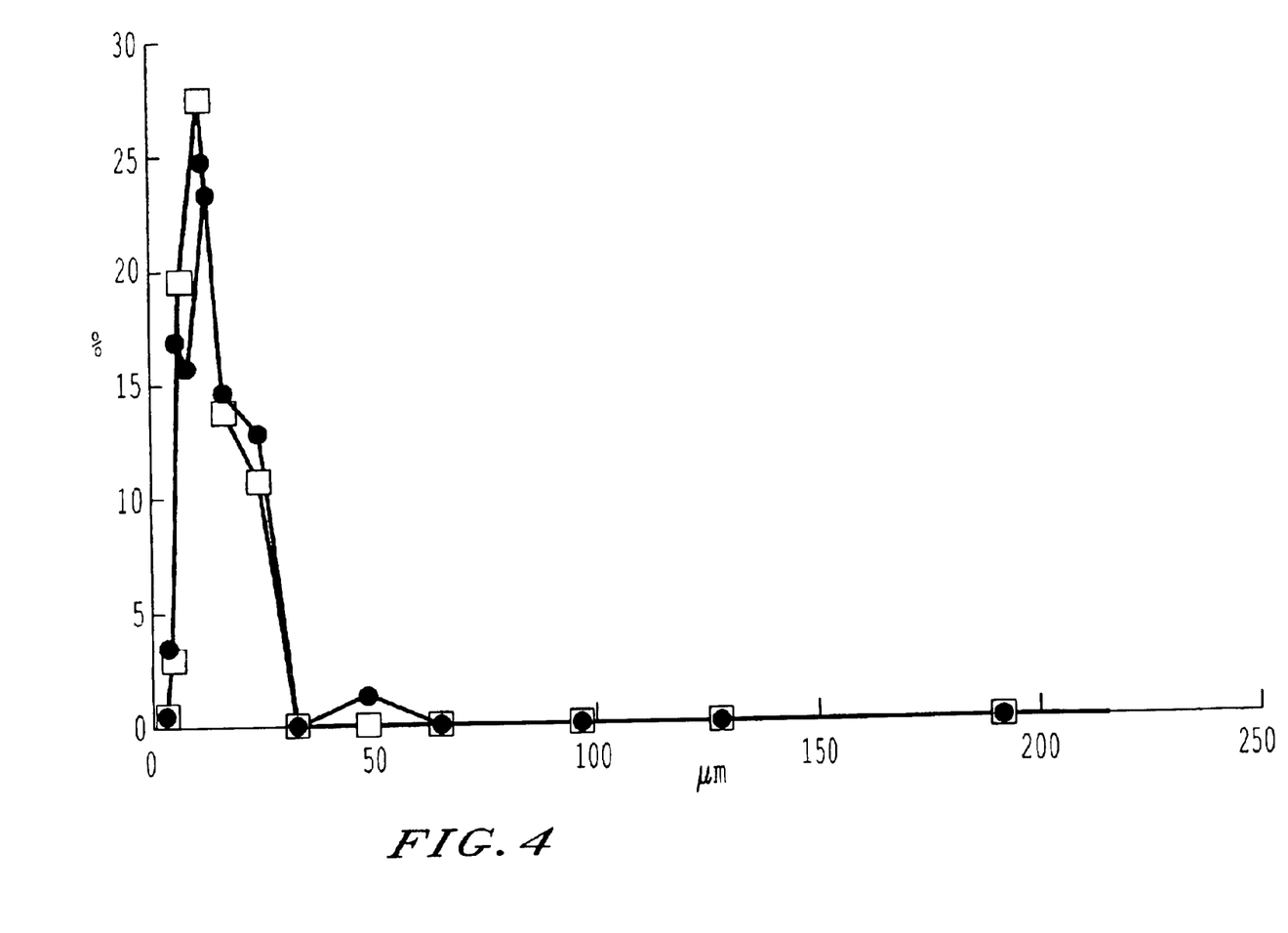

FIG. 4 shows the distribution of the dimensions of the microspheres, determined by Granulometre 715 E608, measured before the ultrasound treatment (curve —●—) and after treatment of 2 hours in ultrasounds (curve —☐—) (Branson Bath 5200). The average diameter of the microspheres expressed in µm is indicated in abscissa, the % of microspheres in ordinate. From the figure it can be observed that the particle distribution is not modified after the ultrasound treatment and that the catalyst therefore has a good mechanical resistance.

EXAMPLE 4 (COMPARATIVE)

A TS-1 is prepared in accordance with U.S. Pat. No. 4,410,501: a solution consisting of 2844 g of TEOS and 153 g of TEOT is added over a period of one hour to 4662 g of TPAOH at 15% by weight in aqueous solution. The end solution obtained is heated slightly to accelerate the hydrolysis and evaporate the ethyl alcohol formed. After about 5 hours at 80° C., 5850 g of water are added. The end solution is charged into an autoclave and heated to 180° C. at autogenous pressure for 5 hours. When the crystallization has terminated, the autoclave is cooled and a lactescent suspension is discharged. 1000 g of this suspension are centrifuged, redispersed in water and centrifuged again; the solid obtained is dried, calcined and used to characterize the crystalline phase. The crystallization yield proved to be 89%, chemical analysis gave the following result:

$SiO_2$=93.97%, $TiO_2$=3.10%

What is claimed is:

1. A process for preparing MFI zeolites having the formula p $HMO_2$·q $TiO_2$·$SiO_2$, wherein M is a metal selected from the group consisting of aluminum, gallium and iron, p has a value ranging from 0 to 0.04 and q has a value ranging from 0.0005 to 0.03, which comprises: subjecting to hydrothermal treatment at autogenous pressure, at a temperature ranging from 190 to 230° C. and for a time ranging from 0.5 to 10 hours, without alkali metals, a mixture containing a silicon source, a titanium source, optionally a source of a metal M, and tetrapropylammoniumhydroxide as templating agent, having the following composition expressed as molar ratios:

Si/Ti=35–2000

M/Si=0–0.04 wherein M is selected from Al, Ga and Fe

TPA-OH/Si=0.2–0.5 wherein TPA= tetrapropylammonium $H_2O$/Si=10–35.

2. The process according to claim 1 wherein the zeolite is TS-1.

3. A process for preparing MFI/MEL or MEL zeolites having the formula x $TiO_2$·(1−x) $SiO_2$ wherein x has a value ranging from 0.0005 to 0.03, which comprises: subjecting to hydrothermal treatment at autogenous pressure, at a temperature ranging from 190 to 230° C. and for a time ranging from 0.5 to 10 hours, without alkali metals, a mixture containing a silicon source, a titanium source, tetraalkylammoniumhydroxide as templating agent, having the following composition expressed as molar ratios:

Si/Ti=35–2000

TAA-OH/Si=0.2–0.5

$H_2O$/Si=10–35.

* * * * *

UNITED STATES PATENT AND TRADEMARK OFFICE
CERTIFICATE OF CORRECTION

| | |
|---|---|
| PATENT NO. | : 7,018,595 B2 |
| APPLICATION NO. | : 10/315022 |
| DATED | : March 28, 2006 |
| INVENTOR(S) | : Carati et al. |

It is certified that error appears in the above-identified patent and that said Letters Patent is hereby corrected as shown below:

On the title page, Item (54), and in Column 1, the Title is incorrect. Item (54) and Column 1 should read:

-- (54) PROCESS FOR PREPARING ZEOLITES --

On the title page, Item (75), the Inventors information is incorrect. Item (75) should read:

-- (75) Inventors: Angela Carati, Milan (IT); Giuseppe Bellussi, Piacenza (IT); Maria Angela Mantegazza, Milan (IT); Guido Petrini, Novara (IT) --

Signed and Sealed this

Fifth Day of February, 2008

JON W. DUDAS
*Director of the United States Patent and Trademark Office*